Figure 1:
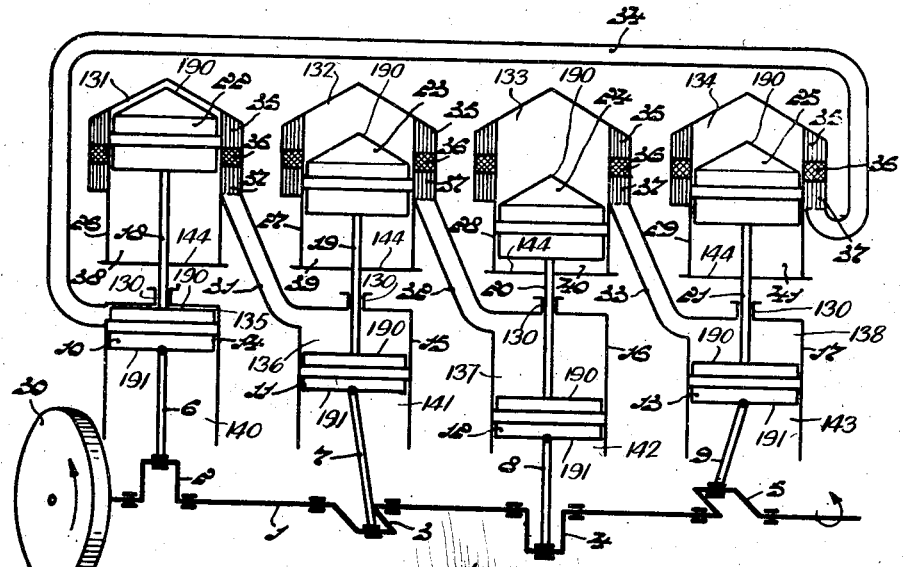

Aug. 30, 1949.  F. L. VAN WEENEN  2,480,525
MULTICYLINDER HOT-GAS ENGINE
Filed Sept. 4, 1945  3 Sheets-Sheet 1

INVENTOR
FRANCISCUS LAMBERTUS VAN WEENEN
BY
ATTORNEY

Aug. 30, 1949.  F. L. VAN WEENEN  2,480,525
MULTICYLINDER HOT-GAS ENGINE

Filed Sept. 4, 1945  3 Sheets-Sheet 2

INVENTOR
FRANCISCUS LAMBERTUS VAN WEENEN

BY E. F. Wentworth
ATTORNEY

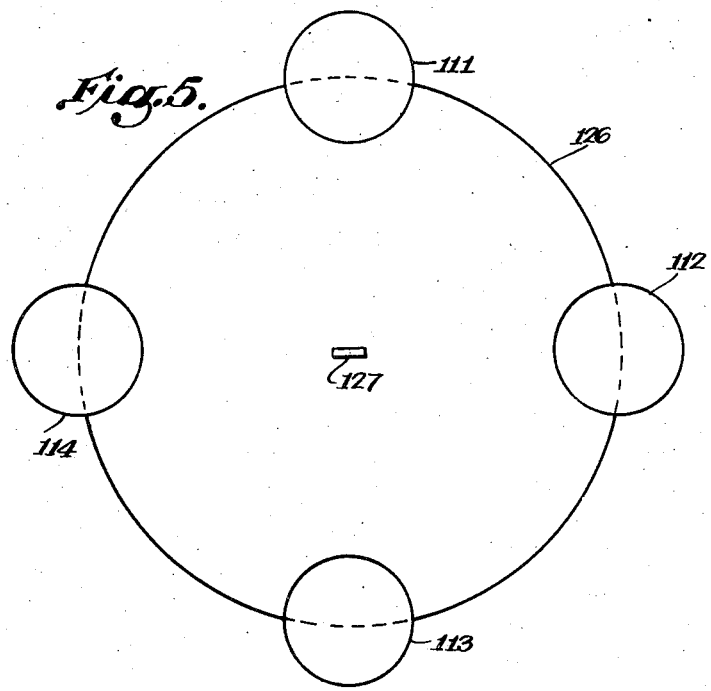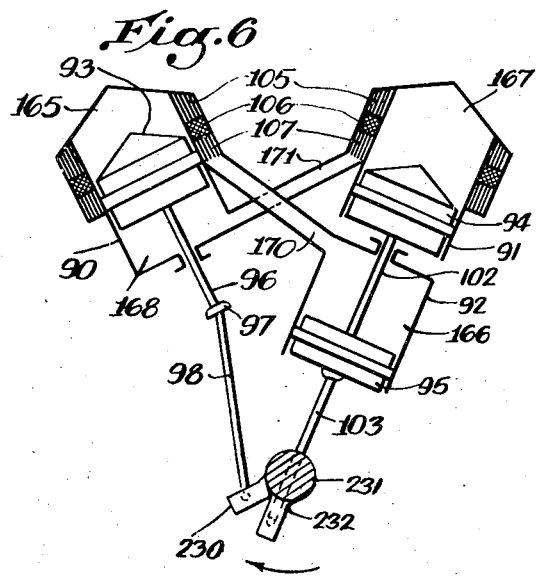

UNITED STATES PATENT OFFICE 2,480,525

MULTICYLINDER HOT-GAS ENGINE

Franciscus Lambertus van Weenen, Eindhoven, Netherlands, assignor to Hartford National Bank & Trust Co., Hartford, Conn., as trustee Application September 4, 1945, Serial No. 614,347
In the Netherlands January 23, 1943

Section 1, Public Law 690, August 8, 1946
Patent expires January 23, 1963

21 Claims. (Cl. 60—24)

My invention relates to multicylinder hot-gas engines.

The term "hot-gas engine" as used herein is to be understood to mean a thermo-dynamic engine in which a quantity of a gaseous working substance, for instance air, passes through a thermo-dynamic cycle while contained within a working space comprising two chambers of variable volume. One of these chambers, known as the "hot chamber", is connected to or has within it a heating element and the second chamber, known as the cold chamber, is connected to or has within it a cooling element; the two chambers being interconnected, if desired, through a regenerator. In such constructions, and also when the working substance is admitted to one or more closed tubes or vessels and then returned to the chambers, the thermo-dynamic cycle is considered to be a closed cycle.

In some constructions, the cooling element may be omitted and air taken in periodically from the atmosphere, in which case the cycle is an open cycle. In both open and closed cycle engines, there is a phase difference between the variations in volumes of the hot chamber and cold chamber, and the working substance is subjected successively to heating, expansion, cooling and compression.

At the hot side of the engine, the working substance may be heated by heating the outside surface of the wall of the hot chamber, but I prefer to provide a separate heater located between the hot side and the cold side of the engine. The use of a separate heater has the advantage that the working substance, while being heated, is divided into a large number of parallel streams of small cross section and thus is more readily heated. In this case, it is advisable to heat at least two of the walls of the channels through which the working substance flows. A cooler constructed similarly to the above-described heater may be employed in closed-cycle engines and a regenerator may be used between the heater and cooler.

My invention is more particularly concerned with multicylinder hot-gas engines of the type in which the working substance passes through a thermodynamic cycle while contained in a plurality of separate working spaces each comprising a hot chamber on the hot side of the engine and a cold chamber on the cold side of the engine. The hot chamber is connected to a chamber on the cold side of the engine and the working substance of each working space is kept separated from the working substance of the other working space or spaces.

In one known type of multicylinder hot-gas engine the cold chamber of each working space is divided into two portions and the phase displacement between the motion of the piston members in the hot chamber and one of the portions of the cold chamber of one working space (which phase displacement is necessary for satisfactory operation) is obtained by connecting these two piston members to a crankshaft by means of cranks forming an angle of about 90° with each other. The volume of the other portion of this cold chamber is varied by a piston member which moves in phase with the piston member which varies the volume of the hot chamber. Such an arrangement is not advantageous because the piston member operating in one portion of the cold chamber of one working space has connected to it two piston members which operate in a hot chamber and a portion of a cold chamber of another working space. Although a motor of this type has the advantage of a somewhat simple driving mechanism, it has the disadvantage that each cold chamber is divided into two portions whose volumes are varied by two separate piston members whose motions are not in phase. Consequently the volume of the cold chamber is not at any instant equal to zero (neglecting unavoidable clearance) with the result that the power output per unit of cylinder capacity of such an engine is deleteriously affected.

The main object of my invention is to overcome the disadvantages of present multicylinder hot-gas engines. More particularly, I aim to increase the power output per unit cylinder capacity of such engines while maintaining a simple driving mechanism and I achieve this by a construction in which the volume of the cold chamber of each working space can acquire a value of zero (neglecting unavoidable clearances).

The multicylinder hot-gas engine according to my invention is characterized by the fact that the operative surfaces of the piston members, i. e., the surfaces which influence the volume of the chambers comprising the working spaces, are always located in pairs at the same distance apart; the operative surface of one piston member of a pair being movable in the hot chamber and the operative surface of the other piston member of this pair being movable in the cold chamber. In addition, for each working space the phase displacement between the operative surface of the piston member in the hot chamber thereof and the operative surface of the piston member in the cold chamber thereof, which phase displacement is required for proper operation, is obtained by influencing the volume of the working substance in a given working space by only two piston operative surfaces which do not move in phase.

In general my engine comprises a plurality of cylinder means comprising one or two cylinders. In each of the cylinder means are movable piston means comprising one piston or two fixedly-connected pistons and having two operative surfaces spaced apart at a fixed distance and forming a cold chamber and a hot chamber respectively with the cylinder means; the hot chamber of each cylinder means being connected by a passageway for the working substance to the cold chamber in another cylinder means and the piston means being so connected as to give the proper phase displacement.

In comparison with known engines in which a cold chamber is divided into two portions and two piston members are always required to vary the volume of the cold chamber of each working space, my engine has the advantage that only one piston member is necessary for varying the volume of the cold chamber of each working space. Consequently, my engine requires only two piston members connected by cranks making a certain angle with each other to vary the volumes of the hot and cold chambers of one working space. In addition to the advantage that the power output per unit of cylinder capacity of my motor is greater than that of known motors, which is due to the fact that in each working space there is only one cold chamber whose volume may be reduced substantially to zero, my engine has the further advantage of a simpler and less expensive construction.

The engine according to the invention may be constructed in various manners while maintaining the main characteristic that each of one or more pairs of operative piston surfaces which influence the volumes of the chambers comprising each working space are formed by the end surfaces of two fixedly-connected piston members, each of which is movable in a separate cylinder means or chamber.

In one embodiment of my invention in which the cylinder means comprises two cylinders, I neutralize at least partly irregularities in the piston rod forces by so constructing the cylinder means that one piston member of one or more pairs is movable so that one of its surfaces which is not in contact with the working substance compresses a gas in one cylinder of the cylinder means.

In accordance with another embodiment of the invention, my engine has a construction in which each of one or more pairs of the operative piston surfaces are formed by the end surfaces of a piston member which is movable in a cylinder, and one end surface acts as a piston in a hot chamber and the other surface acts as a piston in a cold chamber.

In another embodiment of my invention, the engine is constructed as a V-type engine and this has particular advantages because the passageways for the flow of the working substance between the hot and cold chambers of each working space are very short and this in turn reduces to a minimum the clearance of the engine. This advantage is also obtained when, in accordance with another embodiment of the invention, the cylinder means are arranged around a common axis and the piston means are connected to a wobble plate driven mechanism. A further advantage is that all the passageways may be of the same or substantially the same length.

Engines according to my invention are particularly advantageous as regards reversing the direction of rotation, and for this purpose I provide suitable means for connecting the various hot and cold chambers in a different manner for one direction of rotation than for the other direction.

In order that my invention may be more clearly understood and readily carried into effect, I shall describe the same in more detail with reference to the accompanying drawing in which—

Figure 2:
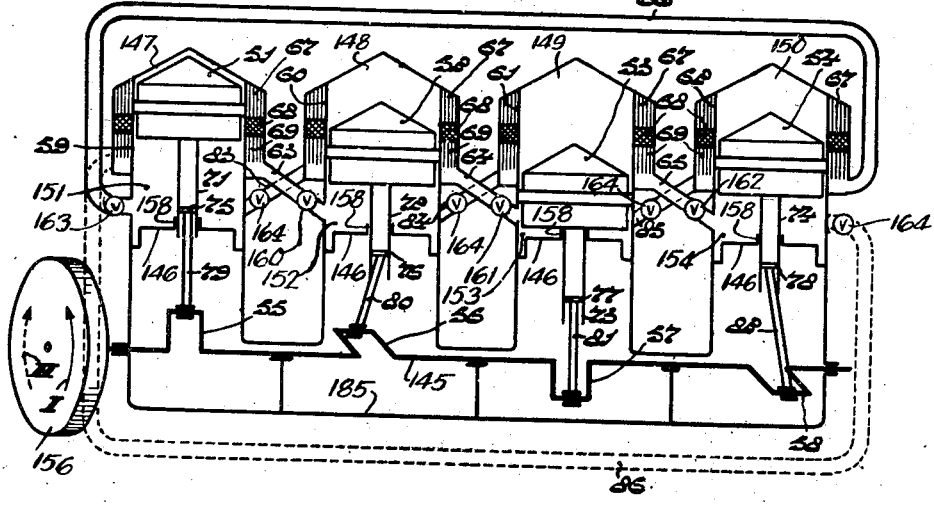
Figure 3:
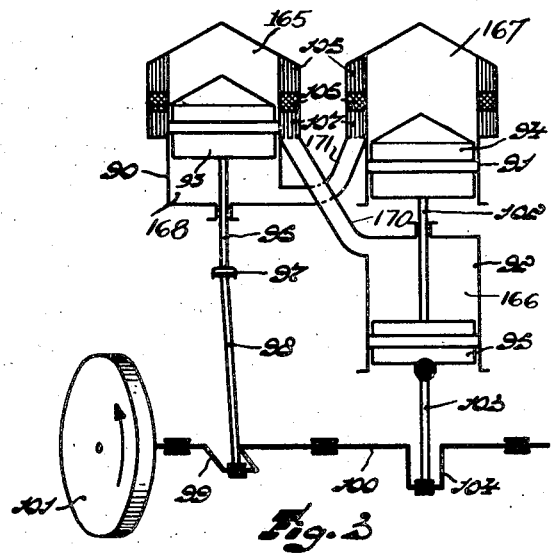
Figure 4:
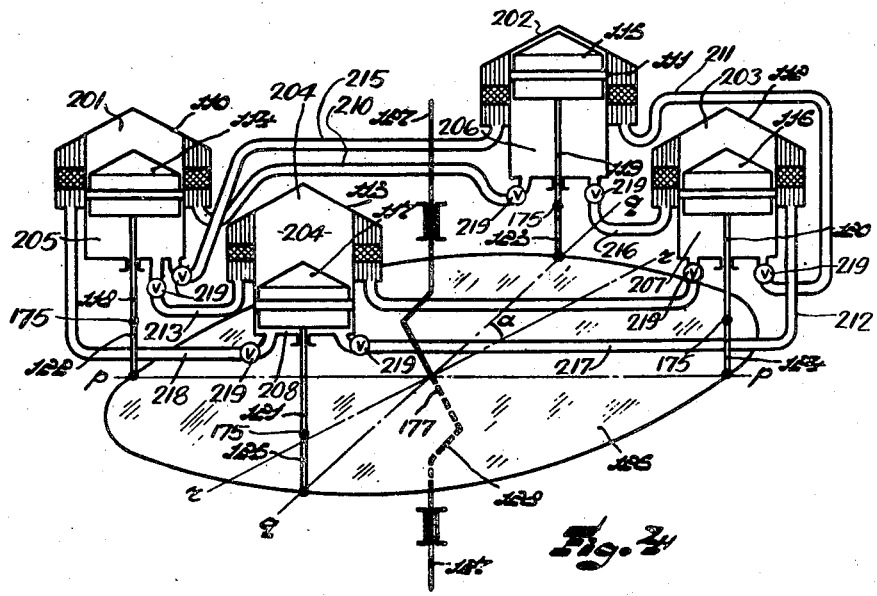

Figure 1 is a diagrammatic view of a four-cycle engine according to my invention, Fig. 2 is a diagrammatic view of a four-cycle engine according to another embodiment of my invention, Fig. 3 is a diagrammatic view of a two-cycle engine according to my invention, Fig. 4 is a diagrammatic view of a four-cycle wobble-plate type engine according to my invention, Fig. 5 is a diagrammatic top view of the engine shown in Fig. 4, and Fig. 6 is a diagrammatic end view of a V-type engine according to the invention.

The hot-gas engine shown diagrammatically in Fig. 1 comprises a crankshaft 1 having four cranks 2, 3, 4 and 5 mounted on a suitable support (not shown) and provided at one end with a flywheel 30. Connected to the cranks 2, 3, 4 and 5 by means of piston or connecting rods 6, 7, 8 and 9 respectively, are four pistons 10, 11, 12 and 13 mounted to reciprocate in cylinders 14, 15, 16 and 17 respectively, provided with piston rings to ensure a gas-tight fit.

Each of the cylinders 14, 15, 16 and 17 is provided at its upper end with a stuffing box 130 through which pass piston rods 18, 19, 20 and 21 respectively. Rods 18, 19, 20 and 21 have their lower ends fixedly secured to the pistons 10, 11, 12 and 13 respectively, and their upper ends fixedly secured to piston members 22, 23, 24 and 25 respectively. Pistons 22, 23, 24 and 25 are mounted to reciprocate in cylinders 26, 27, 28 and 29 respectively, and are provided with piston rings to ensure a gas-tight fit. It will be noted that pairs of pistons 22—10, 23—11, 24—12 and 25—13 are fixedly connected together by the piston rods 18, 19, 20 and 21 respectively, and thus the pistons of each pair do, of course, always move in phase and form a piston means. Each of the cylinder pairs 14—26, 15—27, 16—28 and 17—29 form a cylinder means.

The upper surfaces of pistons 22, 23, 24 and 25 (which surfaces are referred to herein as "operative surfaces") form with the respective cylinders 26, 27, 28 and 29, hot chambers 131, 132, 133 and 134, whereas the upper surfaces of piston members 10, 11, 12 and 13 (which surfaces are also referred to herein as "operative surfaces") form with the corresponding cylinders 14, 15, 16 and 17, cold chambers 135, 136, 137 and 138 respectively.

The hot chamber of each cylinder means is connected with the cold chamber of one of the other piston means through a heater, a regenerator and a cooler to form working spaces for the gaseous working medium. More particularly, hot chamber 131 is connected through a heater 35, a regenerator 36, a cooler 37 and a passageway 31 to the cold chamber 136 of the adjacent cylinder means. Similarly, the hot chambers 132, 133 and 134 are connected through a heater, a regenerator and a cooler and passageways 32, 33 and 34 respectively to the cold chambers 137, 138 and 135 of other cylinder means.

The engine described above has four working spaces in each of which a quantity of the gaseous working medium passes through a thermodynamic cycle and all cycles must be considered simultaneously from an operating viewpoint. Each cycle takes place in two distinct zones involving two cylinders disposed alongside each other and interconnected by a passageway. For the purpose of illustration attention is directed to cylinders 15 and 26 in which one of said cycles takes place. As will be seen, a hot chamber 131 is formed by the cylinder 26 and the piston 22 and a cold chamber 136 is formed by the cylinder 15 and the piston 11. The gaseous working substance of the engine is conducted between the hot chamber and the cold chamber by the passageway 31 which directly interconnects these chambers to form a working space. The heater 35, the regenerator 36 and the cooler 37 through which the working gas also passes is arranged around the hot chamber 131. The necessary phase relationship between the pistons 22 and 11 is effected by the fact that the cranks 2 and 3 to which these pistons are connected, are positioned 90° relative to each other.

In a similar manner the second cycle takes place in a second working space including the hot chamber 132 and the cold chamber 137; the respective pistons are similarly phased relative to each other by reason of the 90° relationship between cranks 3 and 4. The two remaining cycles of the engine take place respectively in two working spaces including hot chamber 133 connected to cold chamber 138 and hot chamber 134 connected to cold chamber 135, and the respective pistons are similarly displaced by the respective 90° displacements of the cranks 4 and 5.

In the above engine the volumes of the chambers in which each cycle takes place are consequently influenced by only two pistons, for example, in the cylinder chambers 26 and 15 by the pistons 22 and 11 respectively. In addition it will be noted that the volume of the cold chambers of each working space is varied only by the operative surface of the piston means in one cylinder means, for instance the volume of cold chamber 136 is varied only by the operative surface of the piston 11 forming part of the piston means 11—23. By a proper choice of the angles which the cranks 2, 3, 4 and 5 make with one another and due to the fact that the volume of working substance in each cycle is influenced by two pistons which cooperate with various cranks, it is seen that two pistons may be rigidly coupled with each crank in such a manner that the operative surfaces 190 of these pistons are always in pairs at the same distance from one another. This makes the driving mechanisms of such a motor exceedingly simple. In order to neutralize completely or at least partly the irregularities of the piston rod forces during its movement, the engine may be constructed in such a manner that one or more pistons such as piston 10, 11, 12 or 13 respectively have their lower sides 191 exposed to the outside atmosphere. The walls of each cylinder containing these pistons are extended downwardly to a degree sufficiently to provide a column of partially trapped air in chambers such as 140, 141, 142 and 143 against which the lower side 191 of these pistons 10, 11, 12 and 13 respectively act to produce an air cushioning action. In the event that additional cushioning action for the pistons and their rods is desired, the lower ends of cylinders 26, 27, 28 and 29 may be partly or fully sealed up as indicated by lines 144 to increase the compression against which the pistons act on the downstroke.

The four cylinder engine diagrammatically illustrated in Fig. 2, which has only four piston members instead of the eight piston members of the engine shown in Fig. 1, has four cylinders 59, 60, 61 and 62 in which are slidably mounted piston members 51, 52, 53 and 54 respectively, each provided with a piston ring to ensure a gas-tight fit. Each of these piston members operates both as a displacement piston and a working or cold piston. Secured at their upper ends to the lower ends of piston members 51, 52, 53 and 54 are tubular driving rods 71, 72, 73 and 74, respectively, which extend through stuffing boxes 158 provided in partitions 146 sealing the lower end of the cylinders to form cold chambers 151, 152, 153 and 154 beneath the piston members.

Connected with their upper ends to the lower ends of driving rods 71, 72, 73 and 74 by means of cross pins 75, 76, 77 and 78, respectively, are connecting rods 79, 80, 81 and 82 whose lower ends are rotatably secured to cranks 55, 56, 57 and 58 of a crankshaft 145 carrying at one end a flywheel 156 and rotatably mounted on a crank case 185. Cranks 55, 56, 57 and 58 are arranged at angles of 90° with respect to the adjacent cranks.

The upper operative surfaces of the pistons 51, 52, 53 and 54 to form hot chambers 147, 148, 149 and 150 with the upper portions of the cylinders 59, 60, 61 and 62. The hot chamber 147 is connected through a heater 67, a regenerator 68, a cooler 69 and a short passageway 63 to the cold chamber 152 to form a working space. In a similar manner the hot chambers 148, 149 and 150 are connected through a heater 67, a regenerator 68, a cooler 69 and passageways 64, 65 and 66, respectively, to cold chambers 153, 154 and 151, respectively to form three separate working spaces.

Passageways 63, 64, 65 and 66 are provided with valves 160, 161, 162 and 163, and cold chambers 151, 152, 153 and 154 are connected to the coolers 69 corresponding to the hot chambers 148, 149, 150 and 147 by passageways 83, 84, 85 and 86 each provided with a valve 164. By selectively opening the four valves 164 or the four valves 160, 161, 162 and 163, and keeping the other four closed, it is possible to reverse the direction of rotation of the engine. When the valves 160, 161, 162 and 163 are open and the valves 164 are closed, the engine rotates in the direction of arrow I. When the valves 160, 161, 162 and 163 are closed and valves 164 are open, the engine rotates in the direction of arrow II.

With respect to the engine shown in Fig. 1, the engine of Fig. 2 has a simpler, less expensive, more compact, and lighter construction which is made possible by the use of a single piston in each cylinder.

Furthermore, comparison with hot-gas engines of known constructions in which each piston is directly connected to each crank, a construction such as shown in Fig. 2 has the advantages that the mass of the reciprocating parts of the engine is much smaller and that the construction is much simpler. In addition, such a construction gives an improvement in the piston rod forces and thus in the regular movement of the piston rod, because one operative surface of the piston acts upon the working substance in a hot chamber and the opposite operative surface acts upon the working substance in a cold chamber. Furthermore, in the construction Fig. 2 the sum of the forces directed toward the crankshaft is always equal to the sum of the forces directed away from the crankshaft (neglecting forces due to friction of the piston rod surface) and this has the advantage of reducing the crankshaft bearing pressure. These advantages are particularly important when the engine operates at a high R. P. M., for instance 500, 1000 or 1500 R. P. M's.

The engine illustrated in Fig. 3 comprises a cylinder 90 and cylinder means comprising two cylinders 91 and 92 in which piston 93 and piston means comprising pistons 94 and 95, respectively, are movable. Piston 93 is a double-acting piston, such as shown in Fig. 2, whose upper operative surface acts in a hot chamber 165 and whose lower operative surface acts in a cold chamber 168, whereas the pistons 94 and 95 are single-acting pistons, as shown in Fig. 1. The upper operative surface of piston 94 acts in a hot chamber 167 and the upper operative surface of piston 95 acts in a cold chamber 166. Piston 93 is connected by a piston rod 96, a crosshead 97 and a driving rod 98 to a crank 99 of a crankshaft 100 carrying a flywheel 101, and mounted near its ends upon suitable bearings. Pistons 94 and 95 are fixedly secured together by a driving rod 102 passing through a stuffing box in the upper wall of cylinder 92, one piston 95 being connected by a piston rod 103 to a crank 104 of the crankshaft 100.

In a manner similar to that described in connection with Figs. 1 and 2, a heater 105, a regenerator 106 and a cooler 107 are arranged at the upper ends of the cylinders 90 and 91. Hot chamber 165 communicates via a heater 105, a regenerator 106, a cooler 107 and a passageway or channel 170 with cold chamber 166 to form a working space, and hot chamber 167 is similarly connected through the corresponding elements and a passageway 171 with cold chamber 168 to form a second working space.

The hot-gas engine shown schematically in Fig. 4 comprises four cylinders 110, 111, 112 and 113 in which double-acting pistons 114, 115, 116 and 117, respectively, are movable therein to produce at the respective opposite ends of the cylinders, hot chambers 201, 202, 203 and 204 and cold chambers 205, 206, 207 and 208. For the sake of clarity, the axes of the cylinders are represented at some distance from one another, a distance greater than exists in practice. The pistons 114, 115, 116 and 117 are symmetrically placed about a vertical crankshaft 127 (see Fig. 5) and as shown in Figure 4 are coupled with piston rods 118, 119, 120 and 121, respectively, and intermediary rods 122, 123, 124 and 125, respectively, to a wobble plate 126 arranged at an angle with respect to the axis of the crankshaft 127. In Fig. 4 the angle of the wobble plate 126 is shown as "α" said angle being measured relative to a plane passing through the axes p—p and q—q perpendicular to the axis of the crankshaft 127. In order to follow any movement of the wobble plate during the operation of the engine, the joints between the rods 122, 123, 124 and 125 and the piston rods 118, 119, 120 and 121 on the one hand and the wobble plate 126 on the other hand are formed as a ball-and-socket joint 175. The wobble plate 126 is coupled to a central arm 177 of a Z-shaped portion 128 of the crankshaft 127 in such manner that the Z-shaped portion 128 is rotatable with respect to the wobble plate 126 but cannot be displaced and cannot leave its perpendicular position with respect to a crankshaft portion 127, so that the wobble plate always occupies a slanting position with respect to the straight portion 127. For interconnecting the respective hot chambers and cold chambers of the engine shown in Fig. 4 there is provided a passageway 210 between the hot chamber 201 and the cold chamber 206, a passageway 211 between the hot chamber 202 and the cold chamber 207, a passageway 212 between the hot chamber 203 and the cold chamber 208, and a passageway 213 between the hot chamber 204 and the cold chamber 205 to thereby form four working spaces. Also provided is a set of passageways 215, 216, 217 and 218 for connecting the hot and cold chambers in the reverse direction. Valves 219 are provided in each of the passageways whereby one or the other of the sets of passageways may be opened, thereby controlling the direction of rotation of the engine.

The combination of a hot-gas engine and a wobble plate, such as that shown in Fig. 4, has several important advantages over other types of engines using a wobble plate, for instance an internal combustion engine.

For example, the passageways for the flow of the working medium between the hot and cold cylinders may have the same or substantially the same length and each working space has substantially the same volume. In addition, as a hot-gas engine does not employ driving mechanisms for other movable members such as valves, slides and the like, it is possible to utilize the advantages of a wobble plate's construction while not being hindered by its disadvantages. The combination of a hot-gas engine and a wobble plate has particular advantages when the pistons are of the double-acting type as shown in Fig. 4 because in this case the load on the piston rods is more or less decreased. This advantage is not present in combinations of an internal combustion engine and a wobble plate because the load due to the large driving forces necessitates a complicated coupling between the driving rods and the wobble plate, and this results in a complicated and expensive construction. With the combination of an engine according to the invention with a wobble plate, there is little or no axial force on the wobble plate and thus complicated axial supporting means, which must be employed when an internal combustion engine is used, are avoided. From the above, it appears that when employing an engine of the type according to the invention with a wobble plate mechanism, I overcome those disadvantages of a wobble plate which, to a large extent, has made its use with other types of engines unsatisfactory.

The hot-gas engine shown diagrammatically in Fig. 6 is an engine similar to that shown in Fig. 3 and comprises two cylinder means similar to those shown in Fig. 3 arranged in a V. For the purpose of simplification, the parts of the engine of Fig. 6 similar to those of the engine of Fig. 3 have been given the same reference numerals. In Fig. 6 the double-acting piston 93 associated with the cylinder 90 is connected through the piston rod 96, the crosshead 97 and the driving rod 98 to a crank 230 of a crankshaft 231. Similarly, the piston members 94 and 95 which are coupled together by means of the rod 102 and associated with the aligned cylinders 91 and 92 are coupled through a driving rod 103 to a crank 232 of the crankshaft 231. The cranks 230 and 232 are so displaced relative to each other that the phase of the movement of the piston 93 is preferably 90° relative to the movement of the piston members 94 and 95.

One of the two working spaces of the engine includes the hot chamber 165 and the cold chamber 166. The gaseous working substance is conducted between these chambers by means of the interconnecting passageway 170 and in its movement passes through the heater 105, regenerator 106 and cooler 107 associated with the cylinder 90. The other of the two working spaces includes the hot chamber 167 and the cold chamber 168; the gaseous working substance being conducted between these chambers by means of the passageway 171 and in its movement passes through the heater 105, regenerator 106 and cooler 107 associated with the cylinder 91.

By reason of the V-shaped construction a compact, single assembly is achieved and at the same time the length of the passageways interconnecting the respective hot and cold chambers is made short and direct.

While I have described my invention with reference to specific examples as to structural features, I do not desire to be limited thereto, as obvious modifications will readily present themselves to one skilled in this art.

What I claim is:

1. A hot-gas engine adapted to operate with a gaseous substance, comprising a plurality of cylinder means, a plurality of piston means each arranged with a substantially gas-tight fit in one of said cylinder means, each of said piston means having two operative surfaces fixed relative to each other and forming with the corresponding cylinder means a hot chamber and a cold chamber respectively, a plurality of passageways each connecting a hot chamber of one cylinder means and a cold chamber of another of said cylinder means to form therewith a working space, the volume of said working space being varied by both the operative surfaces defining the hot chamber and cold chamber of the space, and means associated with said piston means to cause the operative surfaces defining each working space to move in a predetermined phase relationship.

2. A hot-gas engine adapted to operate with a gaseous substance, comprising a plurality of cylinder means, a plurality of piston means each arranged with a substantially gas-tight fit in one of said cylinder means, each of said piston means having two operative surfaces fixed relative to each other and forming with the corresponding cylinder means a hot chamber and a cold chamber respectively, a plurality of passageways each connecting a hot chamber of one cylinder means and a cold chamber of another of said cylinder means to form therewith a closed working space for the gaseous substance, the volume of said working space being varied by both the operative surfaces defining the hot chamber and cold chamber of the space, a regenerator in each passageway, a heater in each passageway between the regenerator and the hot chamber connected thereto, a cooler in each passageway between the regenerator and the cold chamber connected thereto and means associated with said piston means to cause the piston means whose operative surfaces define each working space to move in a predetermined phase relationship.

3. A closed cycle hot-gas engine adapted to operate with a gaseous substance comprising in combination a plurality of cylinders, a plurality of pistons arranged one in each of said cylinders and having operative surfaces forming therewith a plurality of hot chambers and and cold chambers, each hot chamber being axially-aligned with a cold chamber and the volume of each of said chambers being influenced solely by an operative surface of one of said pistons, a driving mechanism connected to said pistons to convert the reciprocating motion of the pistons into rotary motion, the operative surfaces of the pistons of each hot chamber and of the cold chamber axially-aligned therewith being fixed relatively to each other, means forming a plurality of passageways for the flow of the gaseous substance between a hot chamber of one pair of chambers to a cold chamber of an adjacent pair of chambers, a regenerator connected in each passageway, a heater in each passageway between the regenerator and the hot chamber connected thereto, a cooler connected in each passageway between the regenerator and the cold chamber connected thereto, said heater and cooler having a large number of passageways of small cross-sectional area for the passage therethrough of the gaseous substance, and means connecting in predetermined out-of-phase relationship the pistons associated with the hot chamber and cold chamber connected by each passageway.

4. A hot-gas engine adapted to operate with a gaseous substance, comprising a plurality of cylinder means, a plurality of piston means each arranged with a substantially gas-tight fit in one of said cylinder means, each of said piston means having two operative surfaces fixed relative to each other and forming a hot chamber and a cold chamber respectively with the corresponding cylinder means, a plurality of passageways each connecting the hot chamber of one cylinder means and the cold chamber of another of said cylinder means to form therewith a working space whose volume is varied by the operative surfaces defining the space, the volume of the cold chamber of each working space being varied only by the operative surface of the piston means in one cylinder means, and means connected with said piston means to cause the operative surfaces defining each working space to move in a predetermined phase relationship.

5. A hot-gas engine comprising a plurality of cylinder means, driven means, a plurality of piston means arranged one in each of said cylinder means and being connected to said driven means to move in predetermined phase relative to each other, each of said piston means having two thermo-dynamically operative surfaces fixed with respect to each other and forming a hot chamber and a cold chamber respectively with the corresponding cylinder means, connecting means forming a first path for the direct flow of the gaseous working substance between the hot chamber of one of said cylinder means and the cold chamber of another of said cylinder means, connecting means forming a second path for the direct flow of the gaseous working substance between the hot chamber of one of said cylinder means and the cold chamber of another of said cylinder means, and valve means in each of said connecting means.

6. A closed cycle hot-gas engine adapted to operate with a gaseous substance comprising in combination a plurality of cylinders, a plurality of pistons arranged one in each of said cylinders and having operative surfaces forming therewith a plurality of hot chambers and cold chambers, each hot chamber being axially-aligned with a cold chamber and the volume of each of said chambers being influenced solely by an operative surface of one of said pistons, a driving mechanism connected to said pistons to convert the reciprocating motion of the pistons into rotary motion, the operative surfaces of the pistons of each hot chamber and of the cold chamber axially-aligned therewith being fixed relatively to each other, a set of passageways for the flow of the gaseous substance between a hot chamber of one pair of chambers and a cold chamber of an adjacent pair of chambers, a second set of passageways for the flow of the gaseous substance between a hot chamber of one pair of chambers to a cold chamber of an adjacent pair of chambers, a heater associated with each passageway at the hot chamber end thereof, a cooler associated with each passageway at the cold chamber end thereof, said heater and cooler having a large number of passageways of small cross-sectional area for the passage of the gaseous substance, valve means in each passageway to permit opening and closing of each set of passageways, a regenerator associated with each passageway between the heater and the cooler therein, and means connecting in predetermined out-of-phase relationship the pistons associated with the hot and cold chambers connected by each passageway.

7. A hot-gas engine adapted to operate with a gaseous substance, comprising a plurality of groups of aligned cylinders, each group comprising two axially-aligned cylinders, a plurality of pistons each arranged with a substantially gas-tight fit in one of said cylinders, the two pistons in each group of cylinders being fixedly connected together and each piston having an operative surface, said operative surfaces forming a hot chamber and a cold chamber respectively with the corresponding cylinder, a plurality of passageways for the gaseous substance each connecting the hot chamber of one cylinder of each cylinder group and the cold chamber of a cylinder of another of said cylinder groups and forming therewith a closed working space for the gaseous substance, the volume of said working space being varied by both the operative surfaces defining the hot chamber and cold chamber of the space, and means associated with said pistons to cause the operative surfaces defining each working space to move in a predetermined phase relationship.

8. A hot-gas engine adapted to operate with a gaseous substance, comprising a plurality of groups of cylinders, each group comprising two axially-aligned cylinders, a plurality of pistons each arranged with a substantially gas-tight fit in one of said cylinders, the two pistons of each group of cylinders being fixedly connected together and each having an operative surface, said surfaces forming a hot chamber and a cold chamber respectively with the corresponding cylinder, a plurality of passageways for the gaseous substance each connecting the hot chamber of one cylinder of each cylinder group and the cold chamber of a cylinder of another of said cylinder groups and forming with said chambers a closed working space for the gaseous substance, the volume of said working space being varied by both the operative surfaces defining the hot chamber and cold chamber of the space, a regenerator associated with each passageway, a heater associated with each passageway between the regenerator and the hot chamber connected thereto, a cooler associated with each passageway between the regenerator and the cold chamber connected thereto, said heater and cooler having a large number of passageways of small cross-sectional area for the passage of the working substance, and means associated with said pistons to cause the operative surfaces defining each working space to move in a predetermined phase relationship.

9. A hot-gas engine adapted to operate with a gaseous substance, comprising a plurality of groups of cylinders, each group comprising two cylinders open at one end, a plurality of pistons each arranged with a substantially gas-tight fit in one of the said cylinders, the two pistons of each group of cylinders being fixedly connected together and each having an operative surface, said surfaces forming a hot chamber and a cold chamber respectively with the closed end of the corresponding cylinder, a plurality of passageways for the gaseous substance each connecting the hot chamber of one cylinder of each cylinder group and the cold chamber of a cylinder of another of said cylinder groups and forming with the chambers a closed working space for the gaseous substance, the volume of said working space being varied by both the operative surfaces defining the hot chamber and cold chamber of the space, means substantially completely closing the open end of a cylinder of each group to cushion the movement of the pistons and means associated with said pistons to cause the pistons whose operative surfaces define each working space to move in a predetermined phase relationship.

10. A hot-gas engine comprising a plurality of cylinders, driven means, a plurality of pistons arranged one in each of said cylinders and being connected to said driven means to move in predetermined phase relative to each other, each of said pistons forming a hot chamber and a cold chamber respectively with opposite end portions of the corresponding cylinder, and means forming passageways for the flow of the gaseous working substance between the hot chamber of each cylinder and the cold chamber of another of said cylinders.

11. A hot-gas engine adapted to operate with a gaseous substance, comprising a plurality of substantially-closed cylinders, a plurality of pistons each arranged with a substantially gas-tight fit in one of said cylinders and each having two operative surfaces forming with the cylinder a hot chamber and a cold chamber respectively, a plurality of passageways for the gaseous substance each connecting a hot chamber of one cylinder and a cold chamber of an adjacent cylinder and forming with the chambers a closed working space for the gaseous substance, a heater, a cooler and a regenerator associated with each passageway, the volume of said working space being varied by both the operative surfaces defining the hot chamber and cold chamber of the space, and means associated with said pistons to cause the operative surfaces defining each working space to move in a predetermined phase relationship.

12. A closed cycle hot-gas engine adapted to operate with a gaseous substance comprising a plurality of substantially-closed cylinders, a plurality of double-acting pistons each arranged with a gas-tight fit in one of said cylinders and each having two operative surfaces forming a hot chamber and a cold chamber with the ends of the corresponding cylinder, the volume of each of said chambers being influenced solely by the operative surface defining the same, a driving mechanism connected to said pistons to convert the reciprocating motion of the pistons into a rotary motion, a plurality of passageways located externally to said cylinders for passing the gaseous substance directly from the hot chamber of one cylinder to the cold chamber of an adjacent cylinder, a heater positioned in each passageway at the hot chamber end thereof and containing a large number of passageways of small cross-sectional area for the passage of the gaseous substance, a cooler positioned in each passageway at the cold chamber end thereof and containing a large number of passageways of small cross-sectional area for the passage of the gaseous substance, a regenerator positioned in each passageway between the corresponding heater and cooler, and means including said driving mechanism connecting in predetermined out-of-phase relationship the pistons whose operative surfaces define a hot chamber and cold chamber connected by one of said passageways.

13. A hot-gas engine comprising a plurality of cylinders, driven means, a plurality of pistons arranged one in each of said cylinders, said pistons being so connected to said driven means that the pistons of the interconnected cylinders move 90° out of phase relative to each other, each of said pistons forming a hot chamber and a cold chamber respectively with opposite end portions of the corresponding cylinder, and means forming passageways for the flow of the gaseous working substance from the hot chamber of each cylinder and the cold chamber of another of said cylinders.

14. A hot-gas engine comprising a plurality of cylinders, driven means, a plurality of pistons arranged one in each of said cylinders and being connected to said driven means to move in predetermined phase relative to each other, each of said pistons forming a hot chamber and a cold chamber respectively with opposite end portions of the corresponding cylinder, connecting means forming a first path for the direct flow of the gaseous working substance between the hot chamber of one of said cylinders and the cold chamber of another of said cylinders, connecting means forming a second path for the direct flow of the gaseous working substance between the hot chamber of one of said cylinders and the cold chamber of another of said cylinders, and valve means in each of said connecting means.

15. A closed cycle hot-gas engine adapted to operate with a gaseous working substance, comprising a plurality of substantially-closed cylinders, a plurality of double-acting pistons each arranged with a gas-tight fit in one of said cylinders and each having two operative surfaces forming a hot chamber and a cold chamber with the ends of the corresponding cylinder, the volume of each of said chambers being influenced solely by the operative surface defining the same, a driving mechanism connected to said pistons to convert the reciprocating motion of the pistons into a rotary motion, a set of passageways located externally to said cylinders for passing the working substance directly from the hot chamber of one cylinder to the cold chamber of an adjacent cylinder, a second set of passageways located externally to said cylinders for passing the working substance from the hot chamber of each cylinder to the cold chamber of another adjacent cylinder, valve means in said passageways to open and close the same, a heater positioned in each passageway at the hot chamber end thereof, a cooler positioned in each passageway at the cold chamber end thereof, said heater and cooler containing a large number of passageways of small cross-sectional area for the passage of the working substance, a regenerator positioned in each passageway between the corresponding heater and cooler, and means including said driving mechanism connecting in predetermined out-of-phase relationship the pistons whose operative surfaces define a hot chamber and cold chamber connected by one of said passageways.

16. A hot-gas engine adapted to operate with a gaseous substance, comprising a substantially-closed cylinder, a piston arranged with a substantially gas-tight fit in said cylinder and having two operative surfaces forming with the cylinder a hot chamber and a cold chamber respectively, cylinder means comprising two axially-aligned cylinders, piston means comprising two fixedly-interconnected pistons each arranged with a substantially gas-tight fit in one of said two axially aligned cylinders and forming therewith a hot chamber and a cold chamber respectively, a passageway for the gaseous substance connecting the hot chamber of the cylinder and the cold chamber of one of the aligned cylinders to form therewith a closed working space, a second passageway for the working substance connecting the cold chamber of the substantially-closed cylinder to the hot chamber of one of the aligned cylinders to form a second closed working space, the volume of each working space being varied by both the operative surfaces of the pistons defining the hot chamber and cold chamber of the space, and means associated with said pistons to cause the same to move in a predetermined phase relationship.

17. A hot-gas engine comprising driven means, a first cylinder, a first piston connected to said driven means, said piston being arranged in said cylinder and forming a hot chamber and a cold chamber respectively with opposite end portions thereof, cylinder means comprising two aligned cylinders, piston members in each of said aligned cylinders and forming a hot chamber and a cold chamber respectively with the corresponding aligned cylinders, the piston members of said aligned cylinders being connected together and to said driven means to move in predetermined phase relative to the said first piston, a heater, a regenerator and a cooler for each of said first cylinder and said cylinder means, and means forming passageways for the direct flow of the gaseous working substance from the hot chamber of said first cylinder through the heater, regenerator and cooler thereof to the cold chamber of said aligned cylinders and from the hot chamber of said aligned cylinders through the heater, regenerator and cooler thereof to the cold chamber of said first cylinder, each passageway forming with the hot chamber and cold chamber connected thereby a closed working space whose volume is varied by the operative surfaces of both of the pistons of the said chambers.

18. A hot-gas engine comprising a plurality of cylinder means arranged around a central axis, driven means comprising a wobble-plate member having its axis of rotation coincident with said central axis, a plurality of piston means arranged one in each of said cylinder means and being connected to said wobble-plate member to move in predetermined phase relative to each other, each of said piston means having two thermodynamically operative surfaces fixed with respect to each other and forming a hot chamber and a cold chamber respectively with the corresponding cylinder means, and means forming passageways for the direct flow of the gaseous working substance between the hot chamber of each cylinder means and the cold chamber of another of said cylinder means, each passageway forming with the hot chamber and cold chamber connected thereby a closed working space whose volume is varied by both of the operative piston surfaces defining the chambers.

19. A hot-gas engine comprising a plurality of cylinders arranged around a given central axis, driven means comprising a wobble-plate member having its axis of rotation coincident with said central axis, a plurality of pistons arranged one in each of said cylinders and being connected to said driven means to move in predetermined phase relative to each other, each of said pistons having an operative end surface forming a hot chamber and an operative end surface forming a cold chamber with opposite end portions of the corresponding cylinder, and means forming passageways for the flow of the gaseous working substance between the hot chamber of each of said cylinders and the cold chamber of another of said cylinders, each passageway forming with the hot chamber and cold chamber connected thereby a closed working space whose volume is varied by both of the operative piston surfaces defining the chambers.

20. A hot-gas engine comprising a plurality of cylinders arranged around a given central axis, driven means comprising a wobble-plate member having its axis of rotation coincident with said central axis, a plurality of pistons arranged one in each of said cylinders and being connected to said driven means to move in predetermined phase relative to each other, each of said pistons having an operative end surface forming a hot chamber and an operative end surface forming a cold chamber with opposite end portions of the corresponding cylinder, a heater, a regenerator and a cooler for each of said cylinders, connecting means forming a first path for the direct flow of the gaseous working substance from the hot chamber of one of said cylinders through the heater, regenerator and cooler thereof to the cold chamber of another of said cylinders, connecting means forming a second path for the direct flow of the gaseous working substance from the hot chamber of one of said cylinders through the heater, regenerator and cooler thereof to the cold chamber of another of said cylinders, and valve means in each of said connecting means to control the direction of rotation of the engine.

21. A hot-gas engine adapted to operate with a gaseous substance, comprising a substantially-closed cylinder, a piston arranged with a substantially gas-tight fit in said cylinder and having two operative surfaces forming a hot chamber and a cold chamber respectively with the cylinder, two axially-aligned cylinders arranged at an angle with the first cylinder, piston means comprising two interconnected pistons each arranged with a substantially gas-tight fit in one of the aligned cylinders and each having an operative surface, said surfaces forming a hot chamber and cold chamber respectively with like aligned cylinders, a plurality of passageways each connecting one of the hot chambers to one of the cold chambers to form therewith two closed working spaces for the gaseous substance, the volume of each working space being varied by both the operative piston surfaces defining the hot chamber and cold chamber of the space, and means associated with said pistons to cause the operative surfaces defining each working space to move in a predetermined phase relationship.

FRANCISCUS LAMBERTUS van WEENEN.

REFERENCES CITED

The following references are of record in the file of this patent:

UNITED STATES PATENTS

| Number | Name | Date |
| --- | --- | --- |
| 1,536,262 | Olivier | May 5, 1925 |
| 1,613,116 | Michell | Jan. 4, 1927 |
| 1,879,563 | Smith | Sept. 27, 1932 |
| 2,011,964 | Ajam | Aug. 20, 1935 |
| 2,190,812 | Wahlmark | Feb. 20, 1940 |
| 2,272,925 | Smith | Feb. 10, 1942 |